2,798,850

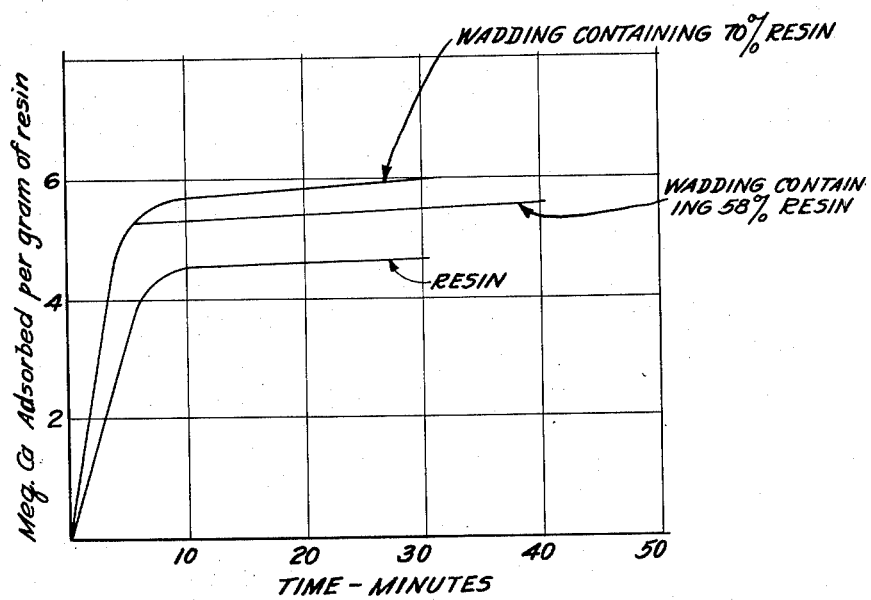
INVENTORS
Edward H. Voigtman
John E. Valente
BY Soans, Anderson, Luedeka & Fieth
ATTORNEYS

ION EXCHANGE RESINOUS PRODUCT

Edward H. Voigtman and John E. Valente, Neenah, Wis., assignors, by mesne assignments, to Kimberly-Clark Corporation, a corporation of Delaware Application January 2, 1952, Serial No. 264,664

1 Claim. (Cl. 210—502)

The present invention relates generally to synthetic resins having ion exchange characteristics, and to compositions of matter and articles made by the use of such resins.

The capabilities of certain synthetic resinous materials to enter into ion exchange reactions is well known in the chemical art, and large quantities of such materials have been so used for some time. Both cation and anion exchange materials are known. Generally, the cation reactive materials are insoluble acids, of relatively large molecular structure, possessing reactive acid groups as part of the resin molecule. These reactive groups may be sulphonic-$SO_3H$, phenolic-OH, or carboxylic-COOH constituents. In the cation exchange reaction (in the acid or hydrogen cycle), cations other than hydrogen ions, such as calcium and sodium ions can exchange with the hydrogen of the reactive acid groups, or if the sodium cycle type reaction is to be used, the reactive acid groups may be preliminarily exchanged to create, in effect, a sodium salt which in turn will react to replace the sodium with certain other types of cations.

The anion exchange materials are likewise insoluble resins of relatively large molecular structure and the materials include a basic constituent, such as an amine. The exact manner in which these anion exchange materials react is not wholly understood. In this connection, the anion exchange phenomenon has been explained by the acid adsorption mechanism and also by the exchange mechanism. In accordance with the acid adsorption mechanism, the anion exchange material is considered to adsorb the whole acid molecule while, on the other hand, the exchange mechanism contemplates the exchange of an anion with a hydroxyl group in the resin. Whatever the explanation, the anion exchange materials effect the removal of anions from solutions.

As previously indicated, resinous exchange materials are generally insoluble in water and in all common solvents. It is widely accepted that ion-exchange resins are true gels, and hence, it has been assumed that these materials are most effective in relatively large particle sizes, due to the ready permeability of the gel structure by the reactive ion-bearing liquid. Based on this understanding of the structure and mode of operation of the known ion exchange resins, preferred and useable ranges of particle sizes have been established, correlated with flow-rates which it was desired to obtain, and commercially satisfactory devices have been constructed in accordance with these accepted principles.

We have discovered, however, that this theory of optimum particle size is not consistent with certain observable characteristics of ion exchange resins, and, we have further discovered the important fact that regardless of whether or not these materials are gels, their effectiveness can be very substantially increased by combining the resin with a fibrous material. It appears that certain types of fibrous materials, either by virtue of a catalytic or other action, considerably augment the reactive capabilities of various ion exchange resins.

The combination of ion exchange resins with fibrous materials in accordance with the present invention has certain other very important advantages. In addition to increasing the chemical efficiency of the resin, the presence of the fibrous material makes it possible to accomplish highly efficient mechanical filtration of either liquids or gases simultaneously with an ion exchange reaction. This considerably extends the field of usefulness of ion exchange resins. Moreover, the presence of the fibrous material makes possible the convenient formation of sheets, tubes, plates, blocks and other structures with resultant great simplification in the mechanical structure of ion exchangers generally. This is especially important in connection with the handling and replacement of the reactive material. For example, if the combined fiber and resin material is in the form of a tube or other unit, the exchanger can be regenerated quickly and simply by merely replacing that unit, and the spent unit can then be regenerated separately from the apparatus with which it is normally associated.

The combination of the reactive resin and the fibrous material can be accomplished in various ways, and the resultant product may take widely varying forms. Possibly the simplest way of effecting the combination is by use of a sheet impregnating operation. For instance, a sheet of paper or tissue, consisting primarily of felted, cellulosic fibers, can be passed through a bath of the resin in an aqueous or other solution, so as to effect either a complete impregnation and surface coating of the individual fibers or a simple coating of fibers. If the resin is used in an aqueous solution the condensation reaction ordinarily will not have progressed beyond its early stages, and the resinous material will effect, in most instances, both impregnation and coating of the cellulosic fibers. If the resin has been condensed to a point where it is no longer water soluble, but is still soluble in organic solvents, the passage of a cellulosic sheet through a bath of the resin dissolved in such solvent will generally effect a coating of the fibers, with comparatively little impregnation. It is, of course, possible to accomplish partial impregnating and complete or partial coating simultaneously, particularly when organic solvents are used, and in certain instances, for example, where cellulosic fiber is employed as the fibrous material, this may be advantageous. Also, when using fibrous materials which are not hydrophilic in nature, as for example, glass fibers and asbestos fibers, it is very difficult to accomplish surface coating by the use of aqueous solutions.

After the coating and impregnation, or the mere coating only, of the fibrous material, it will usually be found desirable at some point in the manufacture of the combined resin and fibrous material to continue the polymerization reaction in the ion exchange resin. However, we have discovered that such reaction need not be continued for certain uses of the coated and impregnated material, as for example when the product is to be used as an air filter. The polymerization reaction may be continued either for the purpose of taking advantage of the mechanical properties of the condensed resin, or for the purpose of attaining full realization of the ion-exchange properties of the resin under certain conditions by advancing the resin to the insoluble state. Condensation of the resin to the so-called advanced-cure or "C" stage will usually be found desirable, and often necessary. Various of the ion-exchange resins require the use of catalysts or hardeners to effect advancement to this stage. The catalyst or hardener (or both) may be added to the impregnating bath, or the impregnated and dried (or partially dried) material can be later immersed in a suitable catalytic solution.

The resinous material can also be applied to the fibers with which it is used by spraying a suitable solution of the resin onto a sheet or loose bat of the fibrous material, and it can be applied to the individual fibers when they are air suspended. Added adhesive or attachment materials may be used, if necessary.

In certain instances, it will be found possible to produce a sheet product containing an ion-exchange resin by adding the resin to the furnish from which the sheet is manufactured on the paper machine, similar to the manufacture of resin-containing sheet materials by the use of beater addition resins. Cellulose in an aqueous suspension is generally considered to assume a negative charge, and accordingly, those resins which possess cationic properties in aqueous solution or suspensions are adsorbed by the cellulose fibers. The resins which exhibit an opposite electrical charge when in an aqueous solution will be found less satisfactory for use in this manner.

In the following specific examples, we shall describe the manufacture of certain novel materials and products which combine ion-exchange resins and fibers in accordance with the discoveries of the present invention. In addition, the highly improved reactive properties of the ion-exchange resins when combined with cellulosic fibers will be noted. It will be understood, however that the following examples merely illustrate a few of the many products and possibilities of the invention.

*Example I*

A multi-ply cellulosic sheet product containing an ion exchange resin of the cation exchange type was manufactured by impregnating a base material which consisted of six superposed sheets or plies of creped cellulosic tissue having a basis weight (uncreped) of about 5.5 pounds for 480 sheets, 24 by 36 inches, with a phthalein-aldehyde resin prepared in accordance with the following procedure.

The resin was prepared by first preparing phenolphthalein by reacting phenol and phthalic anhydride in the presence of sulphuric acid with the application of heat. More particularly, this was accomplished by placing 74 grams of phthalic anhydride, 141 grams of phenol, and 58 grams of concentrated sulphuric acid into a three-necked flask. A thermometer was inserted through one neck, a stirrer through another neck, and a reflux condenser was placed in the third neck. The mixture in the flask was stirred and heated to 115° C. and maintained under this temperature condition for 9 hours. After the heating period, the mixture was cooled to 55° C. The mixture was then neutralized by adding an aqueous sodium hydroxide solution which comprised 80 grams of sodium hydroxide dissolved in 100 grams of water. As a result, the phenolphthalein was converted to a water soluble salt of sodium. After adding the sodium hydroxide solution, the mixture was heated to 87° C. and, in about 20 minutes, 305 grams of an aqueous formaldehyde solution (comprising 37 percent formaldehyde) was added. The phenolphthalein-formaldehyde mixture was maintained at between 85° and 90° C. for three hours and care was taken to prevent the beginning of gel formation. After this period of additional heating, the solution was diluted to 35 percent solids through the addition of about 250 grams of water, thereby providing a resin bath.

The base material of creped cellulosic tissue was then passed through the resin bath at such a rate that the resulting sheet contained about 58 percent by weight of the resinous material, on a bone dry basis. Another multi-ply sheet was similarly impregnated to a resin content of 70 percent. The impregnated materials were then cured so as to advance the resin to the "C" stage of cure. The curing was accomplished by first passing the impregnated sheets through a dryer of conventional type at the rate of 12 feet per minute, the temperature of the dryer being about 75° C. and the length of the dryer being 96 feet. Next, the sheet was placed in an oven for 40 minutes, the oven being maintained at about 105° C.

The resulting materials were excellent for filter purposes but even more important was the fact that the resin, when combined with the base material, exhibited both improved capacity and exchange rate characteristics and, in order to qualitatively compare the characteristics of the resin itself and measure the improvement effected by combining the resin with the base material, resin particles were prepared in the following manner.

The above outlined procedure for preparing the resin was followed except that the final heating step in the resin preparation was continued for an additional two hours so that the total time for this step was five hours. The resulting solution was then poured into shallow pans to effect drying and curing, the resin being cured to the "C" stage. In order to dry and cure the resin to this advanced stage, the solution was first heated for three hours at 100° C., resulting in a gel formation, and the gel was then heated for 15 hours at 115° C. A reddish and hard sponge like mass resulted, which was water and alkali insoluble, and this mass was ground into particles of 18 to 60 mesh. The resin was converted to the hydrogen form by washing in a 4.5 percent hydrochloric acid solution after which the resin was rinsed several times and dried.

The resin impregnated sheets and the resin particles were tested in accordance with a procedure to be hereinafter described and it was found that the capacity of the ion exchange resin was markedly increased by combining the resin with the tissue. In the case of the sheet which contained 70 percent resin, the ion exchange capacity was increased 39.0 percent, while the sheet containing 58 percent wadding had an increase in exchange capacity of 27.8 percent. This procedure was also used to determine the rate of exchange, i. e. the amount of ion exchange which occurs per minute.

Ion exchange capacity and the rate of exchange were measured by determining the amount of calcium ion exchange, in terms of millequivalents of $CaCO_3$ per gram of resin, and the rate at which the exchange takes place. The procedure was carried out by weighing out 1 gram samples of the resin and then weighing out samples of the sheet materials, i. e. the sheet material containing 58 percent resin and the material containing 70 percent resin, in amounts such that each sample comprised 1 gram of resin. These samples were placed in 250 cc. Erlenmeyer flasks, one sample being inserted in each flask, and 200 cc. of a calcium chloride ($CaCl_2$) solution was added to each flask, the solution containing 48 milligrams of $CaCl_2$. The flasks were continuously agitated and aliquot portions of the supernatant liquid were taken at one minute intervals, one portion being taken from each flask. In view of the fact that calcium replaces the hydrogen ion in the resin, the extent of exchange may be determined by titration for acidity and this was done, methyl orange being employed as an indicator.

The results of the above test are shown in the accompanying graph and, in the graph, millequivalents of calcium as calcium carbonate adsorbed per grams of resin is shown along the axis of ordinates while time, in minutes, is shown along the axis of abscissas.

Thus, it is readily apparent that by impregnating tissue with an ion exchange resin both the exchange capacity and rate of exchange of the resin are substantially increased. This is clearly demonstrated in the foregoing and it should be noted that the size of particles employed in the foregoing, i. e. 18 to 60 mesh, are typical of those used for present ion exchange installations.

*Example II*

In the manufacture of another cellulosic sheet product, the base material employed comprised six superposed sheets or plies of creped tissue which had a basis weight, when uncreped, of about 5.5 pounds for 480 sheets, 24 by 36 inches. The sheet was impregnated with a phenolic methylene sulfonic type resin in the manner specified in the previous example. That is to say, the base material was passed through a resin bath at such a rate as to provide a sheet having a resin content of 60 percent, on a bone dry basis, the resin impregnated sheet being then subjected to heat so as to completely cure the resin, i. e. advance the resin to the "C" stage of cure. As in the previous example, this was done by first passing the impregnated sheet through a drying tunnel which was at a temperature of from about 75° to 90° C. The sheet was taken from the drying tunnel after ten minutes and then placed in a curing oven for one hour, the oven being maintained at a temperature of between about 95° and 115° C.

The same resin employed in impregnating the above sheet was prepared in particle form by placing the resin in the form used in making up the resin bath in a shallow pan and heating it in an oven at 105° C. for 16 hours. Complete drying and curing of the resin was thus effected and the cured resin was ground to a particle size of 18 to 60 mesh.

The resin particles and the resin impregnated sheet were then tested to determine not only the exchange capacity but also the rate of ion exchange which is important because it bears a relationship to the rate at which liquids containing ions which are to be removed may be passed through the exchange material and the dimensions of an exchange unit. Thus, if the rate of exchange of the resin is slow, the rate of flow of liquid through the unit must be reduced or the depth of the exchange bed must be increased.

When the resin particles and the resin impregnated sheet were tested, in accordance with the procedure described in the previous example, to determine the exchange capacity, the rate of exchange was also determined. It was found that by combining the resin with the tissue, the capacity was increased and, in addition, the rate of ion exchange was increased almost six times. More specifically, the rate of reaction, which is expressed in mil-equivalents of ion exchanged per gram of resin per minute, of the resin particles was 0.035, while the rate of reaction of the impregnated tissue was 0.183.

The rate of reaction, as expressed above and as used herein, is a constant which may be readily determined because it has been found that ion exchange reactions, in general, are the same as second order bimolecular reactions, see Nachod and Wood, The Reaction Velocity of Ion Exchange, Journal American Chemical Society, vol. 66, page 1380 (1944). As a result, this constant, designated K, may be determined by the following equation, wherein, for the above test procedures, "a" refers to the ions originally in solution, i. e. calcium ions expressed as millequivalents of calcium carbonate, "b" refers to the ions from the resin in the maximum amount released at equilibrium and is expressed in millequivalents of hydrogen chloride, and "x" denotes the amount of ions exchanged at a given time, this amount being expressed in millequivalents of hydrogen chloride:

$$K=\frac{1}{t(a-b)}\ln\frac{b\ (a-x)}{a\ (b-x)}$$

*Example III*

Another cellulosic sheet product was manufactured from a base material of the same type employed in the previous examples and this material was also impregnated with a phenolic methylene sulfonic type resin in the manner set forth in the previous example. The impregnated sheet was then completely cured. The same resin that was employed in impregnating this sheet was cured to the "C" stage, as in the previous example, and ground to a particle size of 18 to 60 mesh.

The base material was impregnated so as to have a resin content of 58.6 percent and another sample was prepared in the same way, this sample having a resin content of 63.0 percent.

The resin particles and the two samples of impregnated base material were subjected to the same tests as in the previous examples to determine the exchange capacity of the resin and the rate of reaction. The resin impregnated sheet materials exhibited an increased exchange capacity per unit of weight of resin as compared to the resin particles, and in addition the rate of reaction was substantially increased. In the case of the resin particles, the rate of reaction was .035 while the resin impregnated material containing 58.6 percent resin had a rate of reaction of .0937, or almost three times that of the resin, in particle form, and the other sample, which comprised 63 percent resin, had a rate of reaction of .152, almost five times that obtained from the resin particles.

*Example IV*

In the manufacture of another multi-ply, cellulosic sheet product containing a cation exchange resin of the phenolic methylene sulfonic type, the base material consisted of nine superposed sheets or plies of creped, cellulosic tissue, having a weight (uncreped) of about 5.5 pounds for 480 sheets (24 by 36 inches). As manufactured, the individual sheets had a crepe ratio of about 2.7, and the multi-ply product had an average crepe ratio of about 2.0, which means that the multi-ply product was capable of being stretched lengthwise 100 percent. The multi-ply sheet was passed through an aqueous solution of phenolic methylene sulfonic type resin. The impregnating liquid contained about 22 percent, by weight, of the impregnating resin and the sheet was moved through the bath at such a rate that the finished sheet contained about 60 percent by weight of the resinous material, on a bone dry basis. After passing through the impregnating bath, the wet sheet was conducted through a drying oven or tunnel, wherein it was subjected to a temperature within the range of from about 75° C. to 90° C., and the sheet remained in the oven for a period of about 20 minutes, the moisture content of the sheet at the conclusion of the drying operation being from about 10 to 15 percent by weight. The resin in the sheet leaving the oven at this point had been cured to an extent where it was no longer fully soluble in water. However, the degree of cure had not progressed to a point where the sheet was noticeably stiff or inflexible, or to a point where the mechanical capability of the resin could be fully realized.

This resin-impregnated sheet product, after having been dried as above described, was capable of being fabricated into various structures. As an example of this, a convolutely wound tube of approximately 108 plies was formed by winding a suitable length of the nine ply product on a mandrel ⅜ inch in diameter. This tube, which had a wall thickness of about 11/32 inch, was then placed in a curing oven, where it was subjected to a temperature of approximately 95° to 115° C. for a period of four to six hours. In the curing oven, the resin was advanced to a substantially complete cure, i. e. the "C" stage of resin cure, and the resultant product was a strong, relatively porous, multi-ply tube. The product exhibited highly satisfactory ion exchange properties. In fact, based on the weight of resin contained in the tube, the ion exchange capabilities of the resin appeared to have been very materially increased over the capabilities of a similar weight of resin in particle or bead form. More particularly, the resin in this combined form had an increased exchange capacity and had an increased rate of exchange characteristic as compared to corresponding amounts of the same resin in particle form.

Moreover, the tube exhibited excellent capabilities as a mechanical filter, a wall thickness 11/32 inch being capable of filtering, from S. A. E. viscosity 30 lubricating oil, particles having an average diameter above about 2 to 4 microns, with flow rates of the order of about 5 gallons per minute per square foot of filter surface (measured at the mean diameter of the tube) with a pressure loss of about 2 pounds per square inch per inch of filter thickness (measured along the direction of flow through the filter), the oil being at about 25° C.

This concept of incorporating an ion exchange resin or resins in a fibrous material to provide a filter product which is capable of mechanical filtration as well as ion exchange absorption or separation is an important feature of the present invention. The filter can be made in sheet, block, tube or extended area form and it can be combined with additional unimpregnated materials or with materials which are impregnated with non-ionic exchange type resins, especially where the amount of ionic-bearing materials constitutes a relatively small percentage of the total material being filtered, or where particular structural characteristics may be desired. Examples of such additional materials will include an added layer or layers of fabric or of fibrous material, perforated or woven metal support tubes or enclosures, and the like. The added layers may surround the filter unit, be disposed within the tube, or constitute one or more layers of the tube itself.

The sheet material described in the foregoing example was also fabricated into a flat board-like product particularly adapted for use as an ion-exchange reaction element or as a filter plate. In one instance, this was done by superposing six layers of the nine-ply product in a suitable platen press. Here the sheets were subjected to a pressure of approximately 2 to 10 pounds per square inch, with platen temperatures of approximately 110° to 120° C. for 30 minutes. The temperature and pressure used were sufficient to effect substantially complete cure of the impregnating resin within the press period. The laminar attachment of the constituent plies was somewhat weak, but the product exhibited excellent reactive and good filtering characteristics.

In the manufacture of a convolutely wound tube, or a plate product, as described above, it will sometimes be found desirable to subject the uncured, resin-bearing sheet to a fine spray of water during the winding operation, or prior to the assembling operation. This aids in obtaining more intimate contact between the layers and results, in the cured final product, in a more homogeneous structure with improved physical properties. As an alternative, or an additional procedure, steam can be admitted to the curing oven during a portion of the curing cycle. Here again, improved physical properties will result, and especially a more homogeneous distribution of the resin throughout the structure. As a still further variation, other resinous or adhesive material may be sprayed or otherwise applied to the constituent sheets either before or after those sheets are assembled during the manufacture of the unit.

*Example V*

In the manufacture of a resin-impregnated sheet product containing a weakly basic, modified-amine, anion exchange type resin, the base sheet material employed constituted a nine-ply laminate similar to the nine-ply sheet used in Example IV. This sheet was impregnated by being passed through a resin-containing bath which was made by mixing about 1250 parts of resin, at a concentration of 43 percent, about 300 parts of a suitable catalyst or hardener, and about 1000 parts of water. The impregnation was carried out under such conditions that the impregnated and dried sheet contained approximately 40 percent by weight of resin, on a bone dry basis. After impregnation, the sheet was then dried at from about 85° to 95° C., for approximately 30 minutes, the drying treatment advancing the cure of the resin to a point where it was substantially insoluble in water. The resultant multi-ply sheet was a relatively flexible sheet containing about 12 to 15 percent residual moisture; it had reasonable keeping qualities; and it was found particularly suitable for manufacturing structural units of either the flat plate or the tube type by following the procedures described above. The high inherent flexibility of this sheet, together with its lack of brittleness particularly adapted the product for manufacture of extended-area filters and like products. As in the previously described embodiment of the invention, the structural units exhibited excellent mechanical filtering abilities and improved ion exchange capacity as compared with the same resin when employed in particle size. In the latter connection, the resin when impregnated into the sheet showed an increase of capacity of as much as 60 percent over the same resin when in particle size of 18 to 60 mesh.

In connection with this embodiment of the invention, wherein the resin used is of a type which requires a catalyst or hardener to effect the curing of the resin, it is not essential that the catalyst be added to the impregnating liquid. In instances where it may be desired to delay the curing operation for a considerable period of time, as when the material may be used at a point remote from the point of manufacture, the sheet can be wetted with a catalyst bearing liquid, by immersion, spraying, or equivalent treatment, immediately prior to the fabricating of the structural unit or other operation. This wetting of the unreacted or partially reacted sheet with the catalyst bearing liquid may also serve to aid in obtaining improved contact between the plies with a minimizing of resin migration, the net result being a more homogeneous product.

After the forming of the partially cured sheet into the desired structural form, the fabricated material is cured to provide a self-sustaining unit, similarly to the final curing process described in connection with Example IV. The modified amine type resins sometimes require the use of lower curing temperatures, and for most available resins, the maximum curing temperature generally should not exceed about 140° C.

*Example VI*

Another sheet of the type specified in the previous example was impregnated with an anion exchange resin of the type and in the manner specified in that example, but the final curing of the resin was accomplished in the absence of air. More specifically, one sample of the impregnated and dried sheet was wrapped in foil to exclude air and heated to 140° C. for 30 minutes, the resin in the sheet being cured to the "C" stage. Another sample of the impregnated sheet was immersed in oil, the oil being heated to 90° C. for 60 minutes, and a third sample of the sheet was placed between caul plates, the sheet being held under a pressure of 20 pounds per square inch for 20 minutes at a temperature of 120° C. In the latter two cases, the resin in each sample was advanced to the same degree of cure as the sample which was cured while wrapped in foil.

In each case where the resin was cured in the absence of air, the impregnated sheet exhibited improved exchange characteristics relative to the sheet prepared in accordance with the previous example. In fact, the sheets cured in the manner described in this example had an increased exchange capacity over the sheets of the previous example. The exact explanation for this improvement is not wholly understood but is believed to result, at least in part, from the fact that an improved bond is achieved between the resin and the fibers.

The improvement which results from curing the sheets in the absence of air is particularly noticeable in the case of anion exchange type resins but it has been found that such improvement also occurs, though to a lesser degree, when sheets impregnated with cation exchange type resins are cured to the "C" stage in the absence of air.

*Example VII*

As exemplary of the manufacture of products wherein the ion exchange resin-bearing material is combined with non-ionic exchange resin materials, suitable sheets for fabrication into self-sustaining, structural units were made by impregnating a laminate consisting of 7 plies of the cellulosic tissue sheet described above with a mixture of a weakly basic, modified amine, anion exchange type resin. The impregnating liquid consisted of 2000 parts of resin solution containing 43 percent by weight of resin, 1000 parts of alcohol, 1800 parts of water, and 500 parts of a catalyst solution. This sheet was dried and the resin was partially cured, as in Example V, the sheet then containing, on a bone-dry basis, about 50 percent by weight of resin. Tube units suitable for use as filters were then made by first winding about a suitable mandrel several layers of bibulous paper which had previously been impregnated with a conventional phenolic formaldehyde, thermo-setting resin, this resin having been previously cured to a point where it was still soluble in organic solvents, but was substantially insoluble in water. Next, a plurality of layers of the sheet material containing the partially cured, ion exchange resin were applied on top of the phenolic resin containing layers, and following this a plurality of additional layers of the bibulous paper containing uncured phenolic resin were applied on top of the previously mentioned layers. The unimpregnated bibulous paper had a dried (or uncreped) basis weight of about 6 to 7 pounds for 480 sheets, 24 by 36 inches.

The composite structure was then placed in a curing oven under such temperature conditions that a substantially complete cure of both types of resins was effected. The resultant structure thus comprised a self-supporting tube having an inner layer of relatively porous fibrous material containing a cured, phenolic formaldehyde resin, an intermediate layer consisting of a fibrous, porous body containing a resin of the ion exchange type (also in the cured state), and an outer layer of the cured, phenolic resin containing material. Tubes manufactured in this manner have remarkable strength and other desirable physical properties. The particular example described was found to be capable of withstanding very high compressive stress (25 to 100 pounds per square inch), and even higher bursting strength. Composite tubes of this general type are particularly adapted for use in filters where high pressures and high flow rates are required, and where the degree of ionic contamination is low.

It will be evident that various combinations of felted or woven materials, resin-impregnated or not, can be manufactured into self-sustaining structural units in this manner. Likewise, it will be evident that similar composite structures can be made in plate or board form with desirable improvement in the physical structure of the product.

Example VIII

In the previous example, the ionic and non-ionic resins were impregnated into separate multi-ply sheets, the sheets being then laminated. However, it has been found that under certain conditions non-ionic and ionic exchange resins may be simultaneously impregnated into sheet materials to provide a wholly unexpected result. Thus, instead of fabricating a composite structure by the use of separately impregnated or separately coated sheets or other units of fibrous materials, the desirable effects of two or more resins can be obtained in certain instances by impregnating or by coating the fibrous material with a mixture of resins. For example, water soluble, basic salt catalyzed phenol-formaldehyde or urea-formaldehyde resins can be mixed with ion exchange resins of the general type set forth above, and this mixture can be used to impregnate or coat fibrous materials. It is not necessary that the ion exchange resin and the conventional thermoset type of resin possess complete or true solubility, one with the other. The ion exchange resin may be dispersed in the form of an emulsion or discrete solid particles in the thermo-set resin, the latter then serving the primary function of bonding the discrete ion exchange particles as well as bonding together the cellulosic fibers involved. The mixing of the resins does not appear to impair the catalytic or other beneficial action which results when ion exchange resins and fibrous materials are mechanically combined, and the addition of resins such as phenol-formaldehyde or urea-formaldehyde does impart improved physical characteristics to the final structural unit. The curing of materials impregnated or coated with resin mixtures should be adjusted to effect complete curing to the "C" stage of all resins used.

As a specific example of such combination, another cellulosic product was prepared by simultaneously impregnating a seven-ply creped tissue of the type used in connection with the previous example, with an alkali catalyzed phenol-formaldehyde resin of the thermo-setting type and a phenolic methylene sulfonic resin of the ion exchange type. Each of the resins was in a water soluble state and an impregnating bath was prepared by dispersing each of the resins in water in a one-to-one ratio, i. e. one part of each resin to one part of water, the sheet being passed through this bath. The doubly impregnated sheet was then passed through a drier oven and the resins in the sheet were cured to the "C" stage in the manner described in Example I.

The exchange capacity of the phenolic methylene sulfonic resin was not impaired even though combined with the thermo-setting resin and, in addition, exhibited improved rate of ion exchange characteristics when compared to the rate of exchange when the resin was in the particle or bead form of 16 to 60 mesh. This lack of impairment of the exchange capacity and the improved exchange rate is wholly unexpected particularly when it is noted that if the foregoing resins are combined in bead or particle form the rate of exchange is decreased.

In general for purposes of this invention, any of the various types of ion exchange resins which are capable of being placed in solution or are capable of being dispersed in liquid can be used in the manufacture of resin impregnated or resin coated fibrous products, either by the methods described in the foregoing, or by other suitable procedures. Since substantially all of the known types of ion exchange resins are used in the fully cured or "C" stage (i. e., when substantially insoluble in water and organic solvents) some difficulty may be experienced in the use of resins which condense at a rapid rate, or which are unstable in a soluble form. Information regarding these characteristics is, of course, readily available, and a selection of a satisfactory resin for the impregnating or coating of fibrous products can be readily made. Generally speaking, it is important merely that the resin shall be capable of being handled as or in a liquid and shall remain in a liquid, or soluble state for a sufficient period of time to accomplish the impregnating or coating treatment.

If the product cannot be processed or converted into the filter or other structural unit for some time, resins which can be kept in a partially unreacted state, or into which retarders can be incorporated, should be selected. Since there are a large number of ion exchange resin materials in the various chemical groups, we shall hereinbelow merely list the groups or classes of resinous materials which are particularly suitable in the practice of the invention. It will be understood for the reasons discussed above, that all of the resins in any one group may not be adapted for combination with fibrous materials in accordance with the present invention. However, each group does include substantial numbers of compounds which are adapted for that use and their selection may be readily made, as above described.

In connection with the curing of ion exchange resins, it is important to note that some of these resins may require rather extended periods of time to reach the "C" stage of cure. Periods up to twenty to thirty hours or even more are sometimes employed, and the curing temperature during this period may be within the range of from 100° to 150° C.

The general group of useful cation exchange resins includes the following:

Alkaline condensed phenol-formaldehyde and phenol-sulfonic acid resins.

Acid condensed phenol-formaldehyde and phenol-sulfonic acid resins.

Phenol-formaldehyde resins condensed in the presence of sodium sulphite and equivalent material.

Alkaline condensed phenol-formaldehyde resins of the type which are cured and dried and then treated with sodium sulphite or equivalent material.

Alkaline condensed salicylic acid-phenol-formaldehyde resins.

Various of the reaction products resulting from the condensation of mono or polyhydric phenols, alone or in combination, with methylene bodies, and especially sulphited tannins such as sulphited quebracho, hemlock, gambier, etc.

The sulphonic acid type resins in the above classification are generally strongly acidic. The carboxylic type resins are generally weakly acidic, and are particularly adapted for treatment with buffers in the accomplishing of highly selective separation, as of amino acids. The resins possessing phenolic reactive groups are usually considerably less acidic than the resins with reactive sulphonic groups, but are more acidic than the resins with reactive carboxylic groups.

Useful anion exchange resins can be selected from the following general groups on classes of resins.

The reaction products of formaldehyde and aromatic amines, such as aniline, toluidine and xylidine.

Melamine-insolubilized amine resins having free amino groups as acid-binding foci.

The reaction products of various polyalkylene polyamines, including triethylene, tetramine, etc. and especially amines containing four or more nitrogen groups with organic compounds selected from the class consisting of ketones and aldehydes, with or without the addition of a saccharide.

The guanidyl-aldehyde type resins which may be alkaline condensed and which result from the reaction between a carbamide compound or derivative having amide and imide groups with a carbonyl compound such as an aldehyde or ketone. This also includes the alkaline condensed guanidylurea-urea-aldehyde resins.

The cured condensates of sulfaphthalein and formaldehyde.

Since the capacity of an ion exchange resin to continue to enter into ion exchange reactions is, in general, directly related to the amount of resin available, it might be thought that as large a percentage of resin, based on the weight of the fiber, should be used as is possible. Our investigations indicate, however, that the amount of resin used should be of the order of from about one-half to three times the weight of the fiber. When the fiber used is impregnated with the ion exchange resin, resin percentages at the higher end of the stated range will usually be obtained fairly readily. If the fiber used is of a non-impregnating type, such as glass or asbestos fiber, lower resin contents will also be found more suitable. The resin content will also be determined, to some extent, by the end use of the product. If a relatively small amount of ion bearing material is to be treated, lower resin contents, within the range stated, will be found more economic, and contrariwise, if large quantities of ionized material will be passed through the material, the economics of regeneration of the resin will point toward resin contents at the higher end of the preferred range.

It is, of course, known that simultaneous cation and anion exchange can be accomplished in a single unit exchanger by the use of a mixture of layers of cation and anion exchange resins. The present invention is especially adapted to the construction of exchangers of this type. Particularly the invention makes possible positive and convenient separation of two types of resins along the hydraulic path, which is particularly desired in these one-step type units.

The fibrous material which is coated or impregnated (or partially coated or partially impregnated) with an ion exchange resin may, as previously indicated, take a wide variety of forms. Cellulosic fibers have certain particular advantages in that they appear to exert a catalytic effect on most, if not all, of the ion exchange resins, tests indicating that the capacity of a given weight of resin may be increased very substantially, as compared with a like weight of granular or bead resin, when used in combination with cellulosic fiber. The cellulosic fibrous material may be in the form of porous or bibulous sheets of varying weights. For filter applications, we may prefer to use a multiplicity of plies of thin, creped, cellulosic tissue having basis weights within the range of from about four and one-half to nine pounds per standard ream (uncreped) of 480 sheets 24 by 36 inches. However, considerably heavier sheets may also be used, and it is possible to manufacture specialized types of filters by the use of relatively dense papers, as for example, kraft, having weights within the range of 30 to 60 pounds per standard ream. The heavier weight, ion exchange resin impregnated or coated papers are generally more suited for edge-type filtration applications. The structural units produced by the practice of the invention may be adapted to the filtration of both gaseous and liquid fluids.

Loose cellulosic fiber can also be introduced into the resinous material during manufacture in amounts up to 80 percent or more of the weight of the final product, and beads, granules or other self-supporting discrete aggregates can be made from this material. The presence of the cellulose will not only greatly increase the surface area of the resin, but it may also exert the catalytic action noted in the foregoing, as well as fortify the intrinsic gel nature of the material, due to the hydrophilic properties of the cellulose. Other fibrous materials can also be mixed with the resin in similar manner.

The mechanical combining of cellulosic or other fibrous materials with ion exchange resins as described in the foregoing, is also of great utility in facilitating the incorporation of such resins into water lay sheet products such as paper or air lay fibrous products, such as batting. If the material is to be introduced into a paper sheet, the fibers of cellulose or other material will be impregnated or coated with the desired resin. The resin will then be brought to a substantially complete state of cure and the product, either in the form of press-sheets, such as pulp, or otherwise, can be introduced into the beater of the papermaking machine in such portions as are desired. By this procedure, the disintegrated resin-coated, or resin-containing, fibrous material will be distributed through the sheet during its manufacture and the resultant web will contain ionically reactive resinous material.

When an air lay felt is to be made, the fibrous material may be disintegrated by a hammermill or other disintegrating mechanism, and deposited on a wire or other carrier in the usual manner of manufacturing air lay felts. The material so felted may consist entirely of resin impregnated or resin coated fibers or those fibers may be mixed in any desired proportion with non-treated fibers, such as wood cellulose fibers and cotton fibers, asbestos fibers, glass fibers, etc. Also, in the manufacture of air lay products, thermoplastic fibers may be added to the material for the purpose of joining together the constituent portions of the web into integral, non-woven fabrics. Combining of the web with thermoplastic or other adhesive material applied to the felt in a random or pattern fashion, as by spraying or printing, may also be done, where increased mechanical strength or other properties are desired.

Bodies of fibers which are inherently self-supporting, as for example, glass wool, nylon, vinyl fibers, etc., may also be coated with ion exchange resins by a spraying or dipping operation and these materials lend themselves particularly to the manufacture of compacted or uncompacted filters and reactive bodies.

In certain of the examples given in the foregoing, mention has been made of the use of catalysts or hardeners for accelerating or otherwise controlling the curing reaction of the resin. In a strict technical sense, the term "catalyst" should be restricted to a substance (or substances) which, by its presence in a reaction mixture, alters the speed of the reaction taking place between the reacting materials, but is not itself altered by the reaction, and is recoverable quantatively, when the reaction is completed. Likewise, the term "hardener" is properly applied only to a substance which not only alters the speed of the reaction, but which enters into the reaction and combines chemically with the reacting materials. However, the terms "catalyst" and "hardener" are used rather loosely in the resin and plastic arts, and are commonly employed interchangeably to describe any added compound or material which accelerates a condensing or other resinification reaction to a desired end product. In accordance with this practice, the terms are similarly used herein, and should be interpreted interchangeably.

In the practice of the present invention, various of the known resin catalysts or hardeners may be used. These include ammonia amines of various types, such as butyl-amine, mono-ethanolamine, di-ethanolamine, methyl-amines, aniline, benzylamine, etc., salts of the alkaline metals, especially calcium, mineral acids, organic acids, aldehydes, etc. Of the materials which are catalysts in the true sense, the amount used will normally be within the range of from about two to five percent of the weight of the resin reactants, although alkaline materials in amounts up to ten percent and even twenty percent of the total weight of the reacting materials are sometimes used. When the material employed enters into the reaction (and is thus a hardener in the technical sense), substantially greater amounts may be used. For example, in some instances amounts up to fifty percent, or more, of the weight of the reaction mixture may be indicated in the production of certain types of resins.

As indicated previously, fibrous materials impregnated with ion exchange type resins may be used for the purpose of removing various substances from gases. When the impregnated materials are used for this purpose, the ion exchange resin is most advantageously not advanced to the highest degree of cure or "C" stage for use, as in the previous examples, but is maintained in a water soluble state or in a state where the resin is soluble in organic solvents, which states are referred to herein as the "A" state and "B" state of cure, respectively.

The resin may be combined with the fibrous material in any one of the several ways previously described, the resin and fibrous material being combined in a weight ratio of from about .01 to 3.0 pounds of resin to one pound of fibrous material. The fibrous material may also be in any of several forms previously described.

Uncured ion-exchange resin-fibrous material combinations have many advantages but have particular advantage when employed as air filters. Such filters are highly effective for not only removing particle impurities but also odors and deleterious substances which are often present in air, especially the air in industrial plants.

*Example IX*

As an example of the manufacture of a highly satisfactory filter, a 6-ply sheet of creped tissue having a basis weight of 7.4 pounds per ream of 480 sheets 24 by 36 inches was impregnated with a phenolic methylene sulfonic resin to a resin content of 30 percent.

Sheet impregnation was accomplished by passing the sheet through a resin bath having a solids content of 0.2 part resin to one part water. After impregnation in the bath, the sheet was dried at room temperature and the dried sheet was placed in suitable frame for use as an air filter. The resulting filter was highly effective in removing odors and various deleterious substances which are common in industrial plants. Furthermore, the resulting sheet was economical and could be easily replaced.

*Example X*

As another example of an air filter construction, the sheet used in the previous example was impregnated with phthalein-aldehyde resin made in accordance with the procedure defined in Example I. As in the case of Example I, a resin bath, comprising 35 percent solids, was prepared and the sheet impregnated in the bath. From the bath, the sheet was introduced into a drier oven at a temperature of about 90° C. for 12 minutes in order to dry the impregnated sheet without substantially advancing the degree of cure. As in the case of the previous example, an economical, highly satisfactory filter element was provided which, in operation, effectively removed undesired materials from air.

As indicated above, various ion exchange type means may be employed and fibrous materials other than sheet materials may be used. It is of greatest advantage that the resin only be cured to the "A" state though satisfactory results are achieved through curing to the "B" state. The ratio of resin to fiber is also of importance for most effective filtering action and this ratio should be within the limits specified above.

In the foregoing, we have disclosed certain new articles of manufacture which include in their structure fibrous materials and ion exchange resins. These products may be in sheet or other form and possess particularly important advantages in the manufacture of improved ion exchange reactors and of mechanical filters for liquids which may contain ionic impurities, as, for example, lubricating oil for internal combustion engines, which may contain acid or other impurities difficult or impossible of removal by any other means. The product of the invention makes possible the manufacture of ion exchangers of greatly increased efficiency and capacity, either alone or as a combination filter and large capacity ion exchange unit. Moreover, a product has been disclosed which accomplishes highly effective gas or air purification. Various procedures have been disclosed for manufacturing fibrous products which comprise a mixture of fiber and an ion exchange resin, and attention has also been directed to the important and desirable effects which have been observed when ion exchange resins are combined with fibers of certain particular types, especially cellulosic fibers.

In this connection, particular attention is directed to the important advantages which result from the use of fibers which can be mechanically combined with the ion-exchange resinous materials. In addition to making possible ion-exchange reactive units of convenient physical form, having mechanical filtration as well as ion-exchange capabilities, the combination of the invention reduces resin loss due to attrition, thus permitting large flow rates with little or no loss of resin; it also greatly improves the hydraulic properties of the reactive unit, i. e., prevents channeling, etc; it increases the resistance of the reactive material to oxidation and reduction; and it facilitates buffer addition and complexing of the reactive resin material. The combination also makes possible the important catalytic effects previously noted.

This application is a continuation-in-part of our co-pending application Serial No. 94,038, now abandoned, which was filed on May 18, 1949, and which has been assigned to the assignee of the present invention.

Various of the features of the invention believed to be new are set forth in the following claim.

We claim:

As a new article of manufacture, a self-sustaining, fluid-permeable unit comprising a pair of superposed, layers of thin creped cellulosic tissue, one of said layers being an association of said tissue and an anion exchange resin which has been cured to the "C" stage and which is present in an amount such that the weight of said anion exchange resin on a dry basis is within the range of from about one-half to three times the dry weight of the tissue constituting said one layer and the other of said layers being an association of said tissue and a cation exchange resin which has been cured to the "C" stage and which is present in an amount such that the weight of said cation exchange resin on a dry basis is within the range of from about one-half to three times the dry weight of the cellulose fiber constituting said other layer.

References Cited in the file of this patent

UNITED STATES PATENTS

| Number | Name | Date |
|---|---|---|
| 2,033,698 | Finn | Mar. 10, 1936 |
| 2,152,901 | Manning | Apr. 4, 1939 |
| 2,196,821 | Arnold | Apr. 9, 1940 |
| 2,263,289 | D'Alelio | Nov. 18, 1941 |
| 2,315,401 | D'Alelio | Mar. 30, 1943 |
| 2,334,904 | Cheetham | Nov. 23, 1943 |
| 2,352,070 | Bock | June 20, 1944 |
| 2,352,071 | Bock | June 20, 1944 |
| 2,354,671 | Eastes | Aug. 1, 1944 |
| 2,357,392 | Francis | Sept. 5, 1944 |
| 2,361,754 | McFarland | Oct. 31, 1944 |
| 2,375,246 | Kasten et al. | May 8, 1945 |
| 2,383,066 | McDermott | Aug. 21, 1945 |
| 2,402,384 | Eastes | June 18, 1946 |
| 2,407,599 | Auten | Sept. 10, 1946 |
| 2,412,855 | Auten | Dec. 17, 1946 |
| 2,460,516 | Luaces | Feb. 1, 1949 |
| 2,461,505 | Daniel | Feb. 15, 1949 |
| 2,480,970 | Rowland | Sept. 6, 1949 |
| 2,512,797 | Harvuot | June 27, 1950 |
| 2,525,497 | Monfried | Oct. 10, 1950 |
| 2,546,938 | Bauman | Mar. 27, 1951 |
| 2,563,897 | Wilson et al. | Aug. 14, 1951 |
| 2,576,864 | Valente | Nov. 27, 1951 |
| 2,582,840 | Maxwell | Jan. 15, 1952 |
| 2,600,845 | Carrigan | June 17, 1952 |
| 2,607,494 | Valente et al. | Aug. 19, 1952 |
| 2,609,360 | Daul | Sept. 2, 1952 |
| 2,648,617 | Hanson | Aug. 11, 1953 |